US009940909B2

(12) United States Patent
Kiichle-Gross et al.

(10) Patent No.: US 9,940,909 B2
(45) Date of Patent: Apr. 10, 2018

(54) DISPLAY SYSTEM WITH A VIRTUAL DISPLAY

(71) Applicant: BARCO N.V., Kortrijk (BE)

(72) Inventors: Becky Gail Kiichle-Gross, Beaverton, OR (US); Matthew R. McLin, Hillsboro, OR (US); David Christian Qualman, Washougal, WA (US); Ryan Charles Dougherty Tindall, Vancouver, WA (US); Benjamin Loren English, Beaverton, OR (US); Andy Eagle Howe, Tigard, OR (US); Albert Frederick George Xthona, Yamhill, OR (US)

(73) Assignee: Barco N.V., Kortrijk (BE)

( * ) Notice: Subject to any disclaimer, the term of this patent is extended or adjusted under 35 U.S.C. 154(b) by 70 days.

(21) Appl. No.: 14/882,680

(22) Filed: Oct. 14, 2015

(65) Prior Publication Data

US 2016/0104460 A1  Apr. 14, 2016

Related U.S. Application Data

(60) Provisional application No. 62/063,465, filed on Oct. 14, 2014.

(51) Int. Cl.
| | |
|---|---|
| *G09G 5/399* | (2006.01) |
| *G09G 5/393* | (2006.01) |
| *G09G 5/14* | (2006.01) |
| *G06F 3/14* | (2006.01) |
| *G06F 9/44* | (2018.01) |

(Continued)

(52) U.S. Cl.
CPC ............... *G09G 5/393* (2013.01); *G06F 3/14* (2013.01); *G06F 9/4445* (2013.01); *G09G 5/14* (2013.01); *G09G 5/377* (2013.01); *G09G 5/397* (2013.01); *G09G 2340/12* (2013.01); *G09G 2340/125* (2013.01); *G09G 2380/08* (2013.01)

(58) Field of Classification Search
CPC .......... G09G 5/14; G09G 5/397; G09G 5/393; G09G 5/399; G09G 2340/12; G09G 5/39; G09G 2360/127; G09G 5/026; G09G 5/377

See application file for complete search history.

(56) References Cited

U.S. PATENT DOCUMENTS

| | | | |
|---|---|---|---|
| 7,477,205 B1 * | 1/2009 | de Waal | G06F 3/1431 345/1.1 |
| 7,557,774 B2 | 7/2009 | Baudisch et al. | |

(Continued)

*Primary Examiner* — Hau Nguyen
(74) *Attorney, Agent, or Firm* — Renner, Otto, Boisselle & Sklar, LLP (57) ABSTRACT

A system for generating a virtual display that is displayed on an existing monitor using a memory (e.g., graphics processing unit (GPU) memory, random access memory (RAM), etc.) of a connected device (e.g., a computer) as a frame buffer for the virtual display. For example, the virtual display may use the RAM or the memory of the GPU of the connected device as a second frame buffer to generate the frames displayed in the virtual display. The virtual display is not a physical display and, thus, does not require any additional hardware or physical space. Rather, the virtual display is displayed on a pre-existing display. The pre-existing display is also used to display the frames generated in a first frame buffer.

19 Claims, 5 Drawing Sheets

(51) Int. Cl.
  *G09G 5/377*    (2006.01)
  *G09G 5/397*    (2006.01)

(56) References Cited

U.S. PATENT DOCUMENTS

| | | | |
|---|---|---|---|
| 8,370,739 B2* | 2/2013 | Matsutani | G06F 3/0488 345/156 |
| 8,782,552 B2 | 7/2014 | Batman et al. | |
| 9,406,281 B2* | 8/2016 | Lee | G06F 3/1423 |
| 2008/0284798 A1* | 11/2008 | Weybrew | G06T 15/503 345/630 |
| 2010/0104217 A1* | 4/2010 | Tsurumi | G06K 9/00335 382/284 |
| 2012/0062573 A1* | 3/2012 | Kashimoto | G06T 1/60 345/501 |

* cited by examiner

DISPLAY SYSTEM WITH A VIRTUAL DISPLAY

RELATED APPLICATIONS

This application claims the benefit of U.S. Provisional Application No. 62/063,465 filed Oct. 14, 2014, which is hereby incorporated herein by reference.

TECHNICAL FIELD

The present invention relates generally to a display system, and particularly to a method and system for adding a virtual display without requiring an additional physical display.

BACKGROUND

In the medical field of radiology, medical practitioners use high-end diagnostic displays to analyze medical images and make diagnostic decisions. A typical radiology or mammography workstation includes multiple displays that allow a radiologist to display multiple images and often multiple software applications. Radiology/mammography workstations frequently also include a "navigational head". A navigational head is a display that allows a user to select and show patient information and information about the images being studied. The actual medical images are primarily displayed on the other displays of the system.

The navigational head frequently displays navigational and support non-diagnostic applications (e.g. dictation software or editing software or software used during the installation). Rather than use an additional high-end diagnostic display, an additional standard type of display, a non-diagnostic quality display is often used. In some situations, however, hospitals do not have the budget or workspace real-estate for the purchase or installation of extra displays or display controllers.

SUMMARY

The present invention provides a system for generating a virtual display that is displayed on an existing monitor using a memory (e.g., graphics processing unit (GPU) memory, random access memory (RAM), etc.) of a connected device as a frame buffer for the virtual display. The virtual display is not a physical display and, thus, does not require any additional hardware. Rather, the virtual display is displayed on a pre-existing display being used to display the content of another frame buffer.

According to one aspect of the disclosure, there is provided a display system for generating a virtual display. The display system includes a display and a display controller. The display controller includes a first frame buffer configured to provide first frames to the display and a second frame buffer configured to provide second frames to the display. Content of the first frames and content of the second frames is transferred to the display and simultaneously displayed by the display such that the content of the second frames at least partially overlap and obscure the content of the first frames.

Alternatively or additionally, the first frame buffer provides the content of the first frames to the display via a video output.

Alternatively or additionally, the video output is at least one of an HDMI output, a VGA output, a DVI output, a component video output, a display port, or a mini-display port.

Alternatively or additionally, the second frame buffer provides the content of the second frames to the display via the video output.

Alternatively or additionally, the content of the first frames and the content of the second frames is combined by the display controller before being transferred to the display.

Alternatively or additionally, the content of the second frames is only transferred to the display and simultaneously displayed with the content of the first frames if a user controllable pointer displayed in the content of the first frames enters a predefined area.

Alternatively or additionally, the predefined area is located outside of the content of the first frames.

Alternatively or additionally, the display controller is a graphics processing unit.

Alternatively or additionally, the graphics processing unit is included in a computing device including a processor operationally connected to the graphics processing unit. The processor is configured to (1) retrieve the content of the first frames and the content of the second frames from the graphics processing unit and (2) combine the content of the first frames and the content of the second frames into third frames. The third frames include the content of the first frames at least partially overlapped and obscured by the content of the second frames. The processor is also configured to provide the third frames to the graphics processing unit such that the graphics processing unit provides the third frames to the display.

Alternatively or additionally, combining the content of the first frames and the content of the second frames into the third frames is controlled by a display control application executed by the processor and stored on a non-transitory computer readable medium of the computing device.

Alternatively or additionally, the content of the second frames is prevented from overlapping a dedicated area of the content of the first frames.

Alternatively or additionally, the portion of the content of the first frames that is overlapped by the content of the second frames is repositionable.

Alternatively or additionally, the overlapping portion is repositioned based on at least one of user intervention, the content of the first frames, or the content of the second frames.

Alternatively or additionally, a user controllable pointer is displayed on the simultaneously displayed content of the first frames and the content of the second frames. As the pointer moves out of a second area displaying content of the second frames and into a first area displaying content of only the first frames, the display controller is configured to display the pointer in pixels of the first area that are adjacent pixels of the second area in which the pointer was previously located.

Alternatively or additionally, a first area of the display displays content of only the first frames and a second area of the display displays content of the second frames. An application being displayed in the first area that is moved into the second area is incorporated into the second frame buffer such that the application is contained in the content of the second frames.

Alternatively or additionally, scaling the application simultaneously scales the size of the second area.

Alternatively or additionally, a first area of the display displays content of only the first frames and a second area of the display displays content of the second frames. An application being displayed in the second area that is moved into the first area is incorporated into the first frame buffer such that the application is contained in the content of the first frames.

Alternatively or additionally, display settings of the second frames are modified in the same manner as settings for the display.

Alternatively or additionally, the display system including an additional display. A portion of the content of the second frames is displayed on the display and the additional display.

Alternatively or additionally, the display system additionally including a processor executing only one operating system. The content of the first frame buffer and the content of the second frame buffer are both determined by the one operating system.

Alternatively or additionally, the display system additionally including a processor executing an operating system. The first frame buffer and the second frame buffer are treated by the operating system as if connected to separate and distinct physical displays.

Alternatively or additionally, the display comprising a liquid crystal display (LCD), cathode ray tube (CRT), or plasma display.

According to another aspect of the disclosure, there is provided a method for generating a virtual display on a physical display connected to a display controller. The method includes determining first frames in a first frame buffer of the display controller and determining second frames in a second frame buffer of the display controller. The method also includes combining content of the first frames and content of the second frames into combination frames. The content of the second frames at least partially overlaps and obscures the content of the first frames in the combination frames. The method further includes transferring the combination frames to the physical display.

Alternatively or additionally, the method also includes only including content in the combined frames from the second frames if a user controllable pointer displayed on the first frames enters a predefined area of the first frames.

Alternatively or additionally, the method also includes preventing the content of the second frames from overlapping a dedicated area of the content of the first frames in the combined frames.

Alternatively or additionally, the method also includes repositioning the overlapping portion of the content of the first frames and the content of the second frames in the combined frames based on at least one of user intervention, the content of the first frames, or the content of the second frames.

Alternatively or additionally, the method also includes displaying a user controllable pointer on the combined frames and, as the pointer moves out of a second area displaying the content of the second frames in the combined frames and into a first area displaying the content of only the first frames in the combined frames, displaying the pointer in pixels of the first area that are adjacent pixels of the second area in which the pointer was previously located.

Alternatively or additionally, the method also includes displaying the content of only the first frames in a first area of the combined frames, displaying the content of only the second frames in a second area of the combined frames, an, if an application displayed in the first area is moved into the second area, incorporating the application into the second frame buffer such that the application is contained in the content of the second frames.

Alternatively or additionally, the method also includes, if the size of the application is rescaled, simultaneously rescaling the size of the second area.

Alternatively or additionally, the method also includes displaying the content of only the first frames in a first area of the combined frames, displaying the content of only the second frames in a second area of the combined frames, and, if an application displayed in the second area is moved into the first area, incorporating the application into the first frame buffer such that the application is contained in the content of the first frames.

Alternatively or additionally, the method also includes displaying the content of the second frames on the physical display and an additional physical display.

Alternatively or additionally, the content of the first frames and the second frames are both determined by a single operating system.

According to a further aspect of the disclosure, there is provided a virtual display program stored in a non-transitory computer readable medium, which, when executed by a processor operationally connected to a display controller, causes the processor to perform the method.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

Features that are described and/or illustrated with respect to one embodiment may be used in the same way or in a similar way in one or more other embodiments and/or in combination with or instead of the features of the other embodiments.

DETAILED DESCRIPTION

In the text as follows, a "display system" is a collection of hardware (displays, display controllers etc.), a "display" is considered to be a physical display device (e.g., a display for displaying 2D content, a display for displaying 3D content, a medical grade display, a high-resolution display, a liquid crystal display (LCD), cathode ray tube (CRT) display, plasma display, etc.), a "frame buffer" is a section of video memory used to hold the image to be shown on the display, and a "display image" is the content of a frame buffer stored in a frame buffer to be outputted on a display, using all or part of the pixels available on the display. A "virtual display image" is a display image without a dedicated display, but with a frame buffer. A "virtual display" is a region on displays used to present a virtual display image.

Further, a display image is not the same as a "desktop". A desktop is the collection of all display images including virtual display images. Additionally, timing and other circuitry on the display controller is configured in a manner such that the operating system will interact with the virtual display's frame buffer as though the image will be shown on a display. Such configuration could comprise setting a VSync (vertical synchronization) interval for the virtual display, generating device interrupts when VSync events occur or setting up horizontal and vertical scanning frequencies, or programming which section of video memory has the image to be displayed.

The present invention provides a system for generating a virtual display that is displayed on an existing monitor using a memory (e.g., graphics processing unit (GPU) memory, random access memory (RAM), etc.) of a connected device (e.g., a computer) as a frame buffer for the virtual display. For example, the virtual display may use the RAM or the memory of the GPU of the connected device as a second frame buffer to generate the frames displayed in the virtual display. The virtual display is not a physical display and, thus, does not require any additional hardware or physical space. Rather, the virtual display is displayed on a pre-existing display. The pre-existing display is also used to display the frames generated in a first frame buffer.

Figure 1:
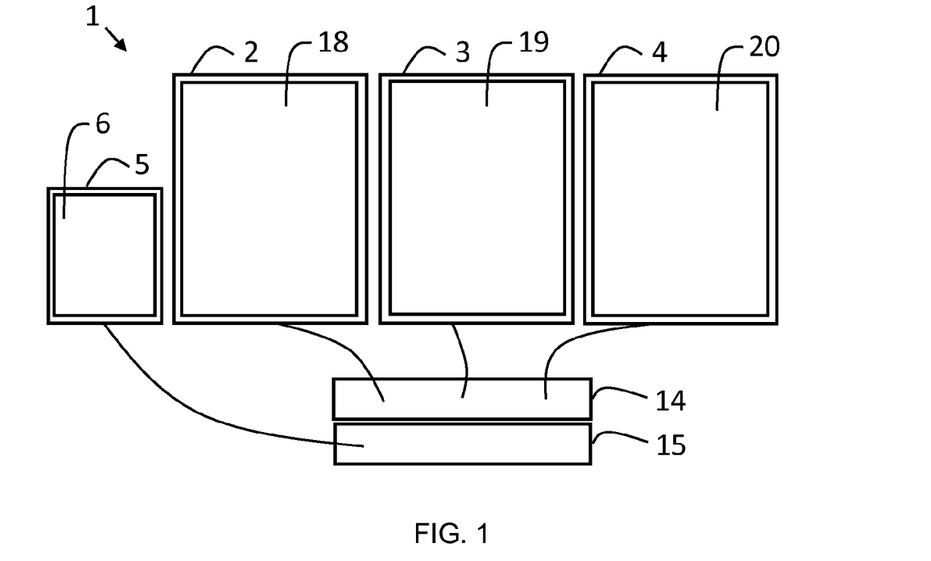
FIG. 1 shows a conventional multi-display system.

FIG. 1 shows an example of a conventional medical display system. In this example, there are two diagnostic displays 2, 3 and a 3D color display 4. These (high-end) monitors are used to show display, e.g., medical images 18, 19 and 20 respectively. For non-diagnostic (or low-end) applications, an additional display 5 is added and used to display image 6. Displays 2, 3 and 4 are connected to the display controller 14. In this example, there are not sufficient ports available in the display controller 14 for the display 5, thus a second display controller 15 is also added.

Figure 2:
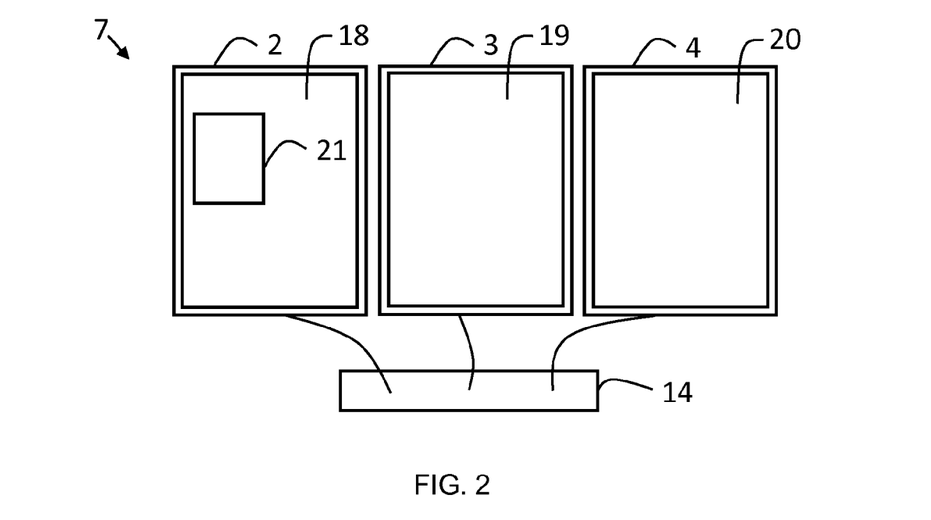
FIG. 2 shows an embodiment of a display system including a virtual display.

Turning to FIG. 2, an exemplary display system 7 is shown. The system 7 includes at least one display 2, 3, 4 and a display controller 14. The system 7 does not include the additional display 5 shown in FIG. 1, which required the inclusion of an additional display controller 15. Instead, the additional display 5 is replaced by a virtual display 21 that is displayed on the at least one display 2. The removal of the additional display 5 reduces cost and requires less space for the display system 7.

Figure 3:
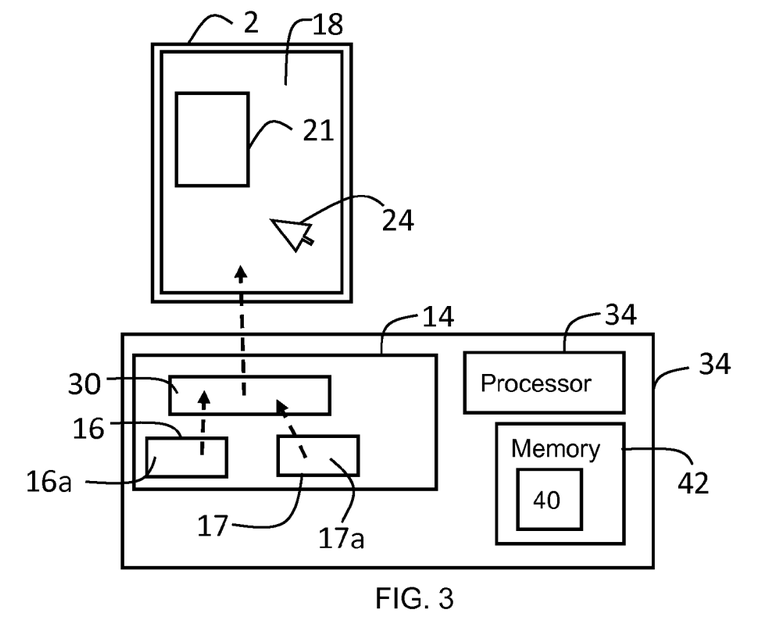
FIG. 3 shows a display controller including a first frame buffer and a second frame buffer.

FIG. 3 shows a first embodiment of the display system 7. In this embodiment, the display 2 is connected to the display controller 14, which includes a first frame buffer 16 and a second frame buffer 17. The first frame buffer stores first frames 16a and is configured to provide the first frames 16a to the display 2. The second frame buffer similarly stores second frames 17a and is configured to provide the second frames 17a to the display 2. The content of the first frames 16a is displayed on the display 2. The content of the first frames 16a may, e.g., be displayed across all of the pixels of the display 2. The content of the second frames 17a is displayed on the virtual display 21, which may be displayed on the display 2.

The content of the first frames 16a and the content of the second frames 17a is simultaneously displayed by the display 2 such that the content of the second frames 17a at least partially overlaps and obscures the content of the first frames 16a.

Displaying the virtual display 21 on the display 2 is performed by transferring the content of the first frames 16a and the content of the second frames 17a to the display 2. The first frame buffer 16 provides the content of the first frames 16a to the display 2 via a video output 30. The second frame buffer 17 may also provide the content of the second frames 17a to the display 2 via the video output 30. The video output 30 may be a wired or wireless connection to the display 2. For example, the video output 30 may be an HDMI output, a mini-HDMI output, a VGA output, a DVI output, a component video output, a display port, a mini-display port, or any other suitable output for transferring frames to the display 2 for display.

The content of the first frames 16a (display images) and the content of the second frames 17a (virtual display images) may be combined by the display controller 14 before being transferred to the display 2. In one embodiment, the content of the first frames 16a and the content of the second frames 17a are combined by moving the content of the second frame buffer 17 into the first frame buffer 16. Thus, when the content of the first frames 16a is transferred to the display 2 and displayed, the content of both the first frames 16a (display image 18) and the second frames 17a (virtual display image) is shown.

As will be understood by one of ordinary skill in the art, the display controller 14 may be an integrated or a dedicated graphics processing unit (GPU) or any other suitable processor or controller capable of providing frames to the display 2. In one embodiment, the display controller 14 is included in a computing device 32 including a processor 34 that is operationally connected to display controller 14. The processor 34 is configured to (1) retrieve the content of the first frames 16a and the content of the second frames 17a from the display controller 14 and (2) combine the content of the first frames 16a and the content of the second frames 17a into third frames. The third frames include the content of the first frames 16a at least partially overlapped and obscured by the content of the second frames 17a. The processor 34 is also configured to provide the third frames to the display controller 14 such that the display controller 14 provides the third frames to the display 2. In one embodiment, the third frames (also referred to as combined frames) are placed back into the first frame buffer 16 and transferred to the display 2. In an alternative embodiment, the third frames are placed into a third frame buffer (not shown) before being transferred to the display 2 via, e.g., the video output 30.

As will be understood by one of ordinary skill in the art, the processor 34 may have various implementations. For example, the processor 34 may include any suitable device, such as a programmable circuit, integrated circuit, memory and I/O circuits, an application specific integrated circuit, microcontroller, complex programmable logic device, other programmable circuits, or the like. The processor 34 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor. The processor 34 may be communicatively coupled to the computer readable medium 42 and the display controller 14 through a system bus, mother board, or using any other suitable structure known in the art.

In one embodiment, the processor 34 may execute a display control application 40 stored on a non-transitory computer readable medium 42 of the computing device 32. The display control application 40 may control the combination of the content of the first frames 16a and the content of the second frames 17a into the third frames.

As shown in FIG. 3, the virtual display 21 can be displayed as a subset of pixels of the display 2. The cursor 24 (here exaggerated in size) can extend over an amount of pixels of the display 2. The "position" of the cursor can be the cursor's "hotspot", a single point within the cursor that applications interpret as representing the cursor's position, such as the tip of an arrow or an averaged centre of the pointer pixel positions. When the cursor 24 is positioned within the borders of the virtual display 21, the display system 7 may allow the user to interact with the content of the virtual display 21 in the same way as if the content were displayed on a separate physical display.

When interacting with the content of the virtual display 21, the output of the interaction with the virtual display 21 may be mapped onto the pixels of the display 2 so that the virtual display image appears to be in front of the display image 18. Thus, within the region where the virtual display 21 is positioned, pixels can display the content of the first frames 16a, the content of the second frames 17a, or a combination of the content of the first frame 16a and the content of the second frame 17a. In this way, the location of the virtual display window may dictate whether a pixel displayed on a display is from pixels that originated from frame buffer 16 or 17.

The virtual display 21 (the content of the second frames 17a) may be prevented from overlapping a dedicated area of the display image 18 (content of the first frames 16a). For example, the virtual display 21 may be prevented from overlapping the upper right portion of the display image 18 (i.e., the content of the first frames 16a). The portion of the content of the first frames 16a that is overlapped by the content of the second frames 17a is repositionable. The overlapping portion may be repositioned based on, e.g., user intervention (e.g., dragging the virtual window 21 using the pointer 24) based on the content of the first frames 16a, or based on the content of the second frames 17a. For example, if a medical image is being shown in the upper portion of the display image 18, then the virtual display 21 may be prevented from overlapping the upper portion of the display image 18.

Figure 4A:
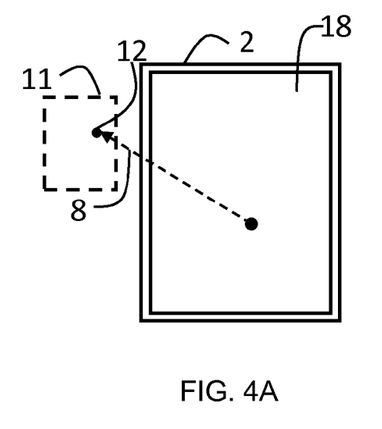
FIGS. 4A and 4B shows an embodiment for controlling when the virtual display is visible on the display.
Figure 4B:
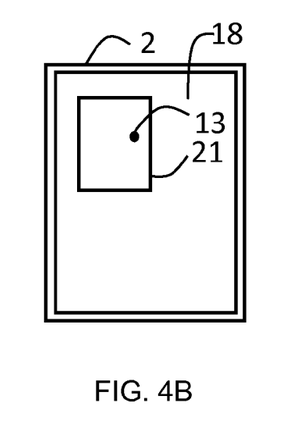

Turning to FIGS. 4A and 4B, an embodiment is depicted in which the virtual display 21 is only depicted when the cursor 24 enters an imaginary display 11. That is, the content of the second frames 17a are only transferred to the display 2 and simultaneously displayed with the content of the first frames 16a if a user controllable pointer 24 displayed in the content of the first frames 16a enters a predefined area 11. In FIG. 4A, cursor movement 8 originates on display image 18 and ends on an imagined display 11 (i.e., the predefined area). That is, a user moves the cursor 24 to the left and off of the display image 18 as if the cursor went outside the display 2. When the user moves the cursor 24 as shown in FIG. 4A such that the cursor 24 enters and resides for a certain amount of time on the imaginary display 11, the virtual display 21 may be activated and launched onto the display 2 as shown in FIG. 4B. The entrance of the virtual display 21 onto the display 2 can be made in a variety of ways, such as popping up, flying in, increasing in opacity until visible, or in any suitable manner.

The virtual display 21 may be prevented from being positioned such that any portion of the virtual display 21 overlaps with the imaginary display 11 to prevent the occurrence of a "hall-of-mirror" effect.

The cursor position 13 relative to the virtual display 21 may correspond to the cursor end position 12 on the imagined display 11. That is, as shown in FIG. 4B, when the cursor moves into the imaginary display 11, the position of the cursor in the imaginary display 11 may be the position of the cursor when the virtual display 21 is shown on the display 2. In this way, the user can interact with the virtual display via the cursor 24 while the virtual display 21 is visible on the display 2. In an alternative embodiment, the virtual display 21 is launched (i.e., displayed on the display 2) by use of a keyboard combination, activation of a dedicated key, when various activities change the virtual display 21, etc. The virtual display can also be closed by various types of operation, such as a key combination, a dedicated key, clicking on specific regions of the virtual display window, or based on the pointer movement.

The virtual display 21 may be assigned to a default size and/or a default position. In one example, the default size of the virtual display 21 maintains an aspect ratio of 1 to 1 (i.e., one inch on the virtual display 21 is displayed as one inch on the display 2).

Figure 5:
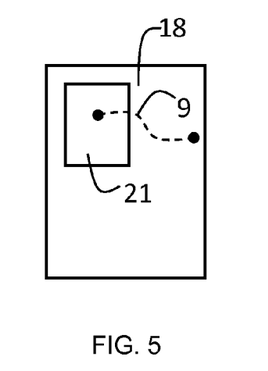
FIG. 5 depicts movement of the cursor from the virtual display onto a display image.

FIG. 5 shows the path 9 of a user controllable pointer displayed on the simultaneously displayed content of the first frames 16a and the content of the second frames 17a. As the pointer moves out of a second area (e.g., the virtual display 21) displaying content of the second frames 17a and into a first area (e.g., the display image 18) displaying content of only the first frames 16a, the display controller 14 is configured to display the pointer in pixels of the first area that are adjacent pixels of the second area in which the pointer was previously located. That is, the cursor movement 9 traverses over the mapped boundary between the virtual display 21 and the display image 18. If the cursor is going to the right from the virtual display 21 to the display image 18, it transitions over the border, leaving pixels from virtual display 21 and ending up on pixels of display image 18 that neighbor the pixels of the virtual display 21 in the direction of the movement. Thus, the cursor does not jump from the right edge of the virtual display 21 to the left edge of the display image 18 or in any other way make a discontinuous movement.

Figure 6A:
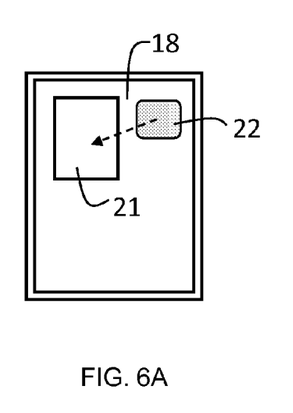
FIGS. 6A-6C depicts moving an application from a display image to the virtual display as well as resizing the virtual display.
Figure 6B:
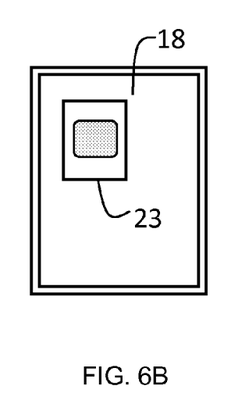
Figure 6C:
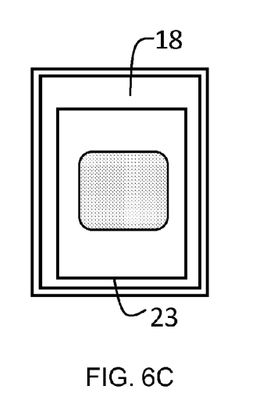

Turning to FIG. 6A, an application 22 is being displayed in a first area (display image 18) of the display 2 displaying content of only the first frames 16a. As shown in FIG. 6B, the application 22 may be moved (e.g., "dragged and dropped") into a second area (virtual display 21) of the display displaying content of the second frames 17a. As shown in FIG. 6C, the combination of the virtual display 21 and the application 22 creates an entity 23 that may be scaled to a larger or smaller size, moved, stretched, shrunk, minimized, maximized, etc. As shown in FIG. 6C, scaling the application simultaneously scales the size of the second area. Similarly, scaling the size of the second area simultaneously scales the application. In these examples, when the virtual display 21 is activated and the application 22 is dropped onto the virtual display 21, the application's reference display (i.e., the frame buffer the application is associated with) is changed to the virtual display 21.

While not shown, an application 22 being displayed in the second area that is moved into the first area may similarly be incorporated into the first frame buffer 16 such that the application 22 is contained in the content of the first frames 16a.

In one embodiment, display settings of the second frames 17a are modified in the same manner as settings for the display 2. That is, the display controller 14 interacts with the virtual display 21 as if it were a physical display. For example, a processor 34 executing an operating system may treat the first frame buffer 16 and the second frame buffer 17 as if the frame buffers 16, 17 were connected to separate and distinct physical displays as opposed to a single physical display 2. In this example, the content of the first frame buffer 16a and the content of the second frame buffer 17a may both be determined by the one operating system. In other words, the present disclosure does not emulate a video card to create the display images to be presented on the displays or use commercial system calls to copy display images, to hook cursor movement or keyboard usage, etc. Rather, the present disclosure generates content for the display image 18 and the virtual display 21 with existing hardware in the same way for all displays, virtual or otherwise.

While the above examples and the figures depict a single physical display 2 and a single virtual display 21, the present disclosure is not limited to single displays or single virtual displays. Rather, the present disclosure may be applied to several virtual displays, e.g., implemented within the same display controller or system. For example, the display system 7 may include an additional display and a portion of the content of the second frames 17a may be displayed on the display 2 and the additional display.

Additionally, while the above examples primarily describe overlaying the virtual display 21 onto the display image 18, the content of the display image 18 under (i.e., covered by the virtual display image) is not necessarily entirely invisible due to the presence of the virtual display image. Rather, the virtual display 21 may, e.g., be partially transparent, allowing a user to see both the virtual display image and the underlying display image 18 at the same time.

Figure 7:
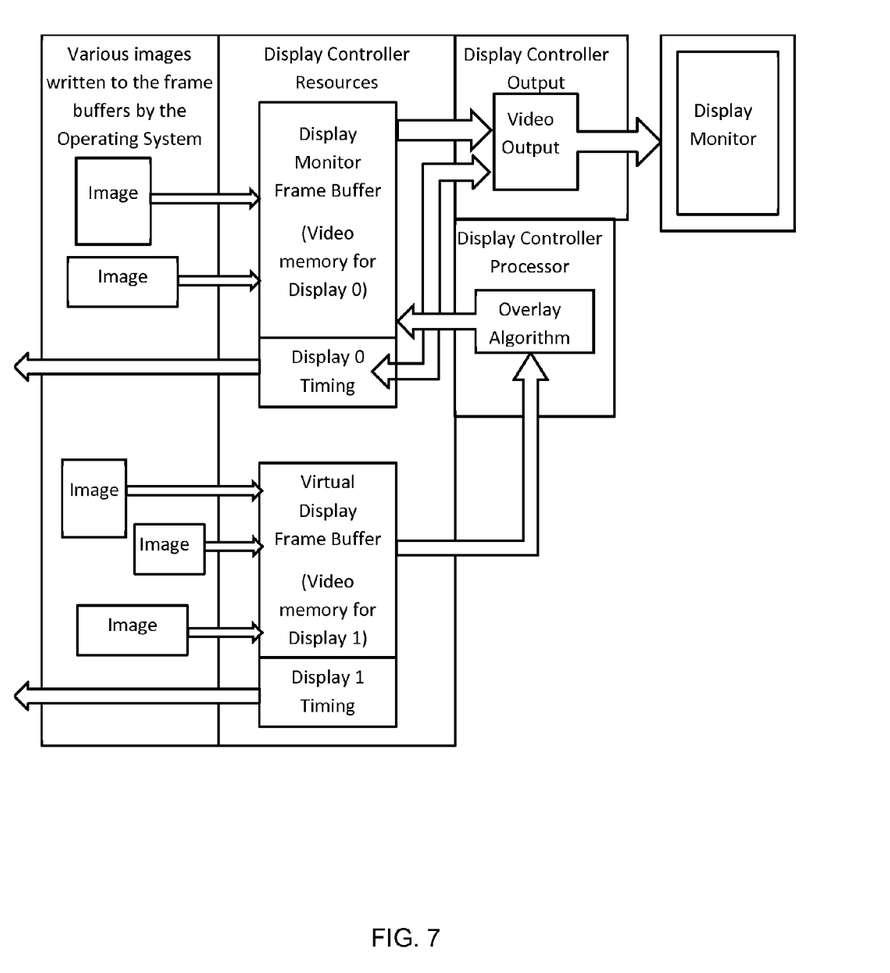
FIG. 7 shows a system diagram of the display system.

Turning to FIG. 7, a system diagram is shown. The display controller 14 is configured to interact with software and control the display 2, such as establishing vertical and horizontal scanning frequencies, setting a VSync (vertical synchronization) interval, and enabling a hardware interrupt to signal software when the VSync interval expires. Memory on the display controller 14 is configured to be used as a first frame buffer 16 for the display 2.

The display controller is also configured to control the virtual display 21 and to interact with software, such as establishing vertical and horizontal scanning frequencies, setting a VSync (vertical synchronization) interval, and enabling a hardware interrupt to signal software when the VSync interval expires. The memory on the display controller 14 is also configured to be used as the second frame buffer 17 for the virtual display 21.

The display controller 14 is configured to output the content of the first frame buffer 16 to the display 2, e.g., in conjunction with the timing programmed for the display 2. The display controller 14 (e.g., a processing unit of the display controller 14) is also configured to copy a portion or all of the second frame buffer 17 into a region of the first frame buffer 16, with or without scaling.

Figure 8:
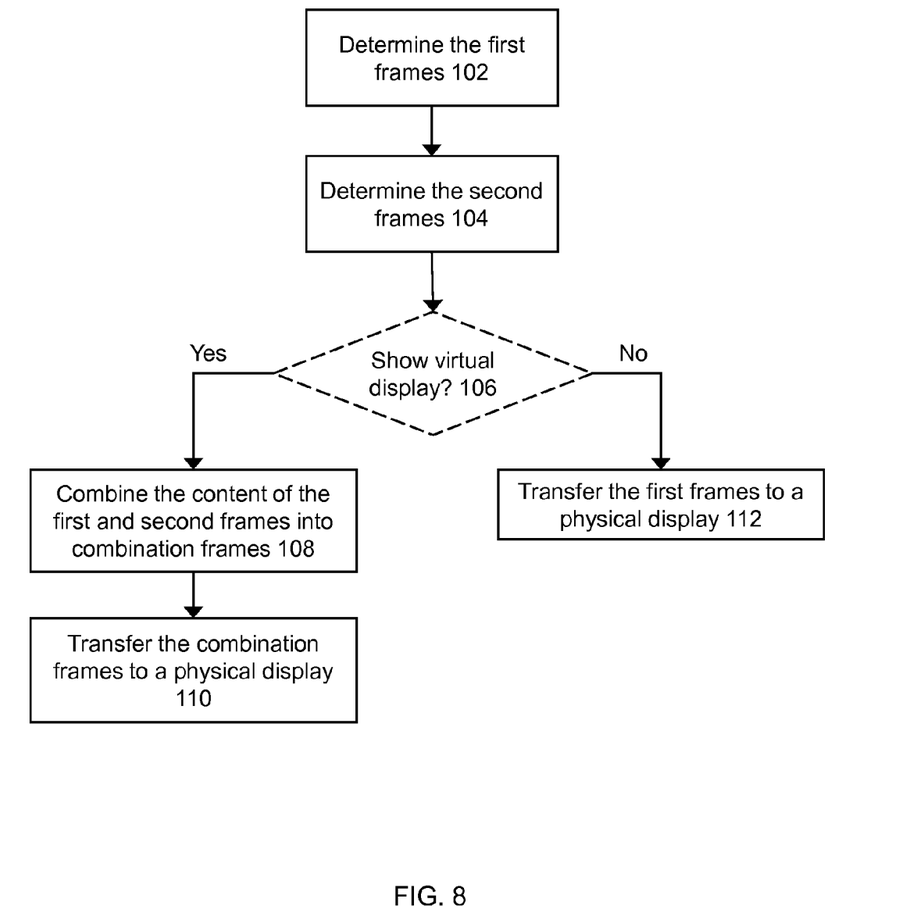
FIG. 8 is a flow diagram of a method for generating a virtual display on a physical display connected to a display controller.

Turning to FIG. 8, a flow diagram for a method for generating a virtual display 21 on a physical display 2 connected to a display controller 14 is shown. As will be understood by one of ordinary skill in the art, the method may be performed by a virtual display program stored in a non-transitory computer readable medium, which, when executed by a processor that is operationally connected to a display controller, causes the processor to perform the method. In process block 102, the method determines the first frames 16a in the first frame buffer 16 of the display controller 14. In process block 104, the method determines the second frames 17a in the second frame buffer 17 of the display controller 14. In optional decision block 106, a check is performed to determine if the virtual display 21 is to be displayed. For example, the method may only include content in the combined frames from the second frames 17a if a user controllable pointer 24 displayed on the first frames 16a enters a predefined area of the first frames.

If the virtual display 21 is to be displayed or if optional decision block 106 is not performed, the method moves to process block 108. In process block 108, the content of the first frames 16a and the content of the second frames 17a is combined into combination frames. The content of the second frames 17a at least partially overlaps and obscures the content of the first frames 16a in the combination frames. The content of the second frames 17a and the content of the first frames 16a may be combined such that the content of the second frames is prevented from overlapping a dedicated area of the content of the first frames in the combined frames. In process block 110, the combination frames are transferred to the physical display 2.

In process block 112, if the virtual display 21 is not to be displayed, then the first frames 16 are transferred to a physical display 2.

What is claimed:

1. A display system for generating a virtual display, the display system comprising:
   a display; and
   a computing device comprising:
      a graphics processing unit including a first frame buffer storing first frames and a second frame buffer storing second frames;
      a processor separate from and operationally connected to the graphics processing unit, the processor configured to:
         retrieve the content of the first frames and the content of the second frames from the graphics processing unit;
         combine the content of the first frames and the content of the second frames into third frames, wherein the third frames include the content of the first frames at least partially overlapped and obscured by the content of the second frames; and
         provide the third frames to the graphics processing unit;
      wherein the graphics processing unit is configured to provide the third frames to the display.

2. The display system of claim 1, wherein the first frame buffer provides the content of the first frames to the display via a video output.

3. The display system of claim 2, wherein the video output is at least one of an HDMI output, a VGA output, a DVI output, a component video output, a display port, or a mini-display port.

4. The display system of claim 2, wherein the second frame buffer provides the content of the second frames to the display via the video output.

5. The display system of claim 1, wherein the content of the second frames is only transferred to the display and simultaneously displayed with the content of the first frames if a user controllable pointer displayed in the content of the first frames enters a predefined area.

6. The display system of claim 5, wherein the predefined area is located outside of the content of the first frames.

7. The display system of claim 1, wherein combining the content of the first frames and the content of the second frames into the third frames is controlled by a display control application executed by the processor and stored on a non-transitory computer readable medium of the computing device.

8. The display system according to claim 1, wherein the content of the second frames is prevented from overlapping a dedicated area of the content of the first frames.

9. The display system according to claim 1, wherein the portion of the content of the first frames that is overlapped by the content of the second frames is repositioned based on at least one of user intervention, the content of the first frames, or the content of the second frames.

10. The display system according to claim 1, wherein:
a user controllable pointer is displayed on the simultaneously displayed content of the first frames and the content of the second frames; and
as the pointer moves out of a second area displaying content of the second frames and into a first area displaying content of only the first frames, the graphics processing unit is configured to display the pointer in pixels of the first area that are adjacent pixels of the second area in which the pointer was previously located.

11. The display system according to claim 1, wherein:
a first area of the display displays content of only the first frames;
a second area of the display displays content of the second frames;
an application being displayed in the first area that is moved into the second area is incorporated into the second frame buffer such that the application is contained in the content of the second frames; and
a particular application being displayed in the second area that is moved into the first area is incorporated into the first frame buffer such that the particular application is contained in the content of the first frames.

12. The display system according to claim 1, further comprising an additional display, wherein a portion of the content of the second frames is displayed on the display and the additional display.

13. The display system according to claim 1, wherein the processor executes only one operating system and the content of the first frame buffer and the content of the second frame buffer are both determined by the one operating system.

14. The display system according to claim 1, wherein the processor executes an operating system and the first frame buffer and the second frame buffer are treated by the operating system as if connected to separate and distinct physical displays.

15. A method for generating a virtual display on a physical display connected to a graphics processing unit operationally connected to and separate from a processor, the method comprising:
determining first frames in a first frame buffer of the graphics processing unit;
determining second frames in a second frame buffer of the graphics processing unit;
combining with the processor content of the first frames and content of the second frames into combination frames, wherein the content of the second frames at least partially overlap and obscure the content of the first frames in the combination frames;
providing the combination frames to the graphics processing unit using the processor; and
transferring with the graphics processing unit the combination frames to the physical display.

16. The method of claim 15, further comprising only including content in the combined frames from the second frames if a user controllable pointer displayed on the first frames enters a predefined area of the first frames.

17. The method of claim 15, further comprising repositioning the overlapping portion of the content of the first frames and the content of the second frames in the combined frames based on at least one of user intervention, the content of the first frames, or the content of the second frames.

18. The method of claim 15, wherein the content of the first frames and the second frames are both determined by a single operating system.

19. A virtual display program stored in a non-transitory computer readable medium, which, when executed by a processor operationally connected to a graphics processing unit, causes the processor to perform the method of claim 15.

* * * * *